(12) United States Patent
Matsumoto

(10) Patent No.: US 9,257,716 B2
(45) Date of Patent: Feb. 9, 2016

(54) BATTERY

(75) Inventor: Mizuho Matsumoto, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/820,173

(22) PCT Filed: Jan. 13, 2012

(86) PCT No.: PCT/JP2012/000191
§ 371 (c)(1),
(2), (4) Date: Mar. 1, 2013

(87) PCT Pub. No.: WO2013/105141
PCT Pub. Date: Jul. 18, 2013

(65) Prior Publication Data
US 2014/0312681 A1  Oct. 23, 2014

(51) Int. Cl.
*H01M 10/04* (2006.01)
*H01M 2/20* (2006.01)
*B60R 16/033* (2006.01)
*H01B 7/30* (2006.01)
*H01M 10/0525* (2010.01)

(52) U.S. Cl.
CPC ......... *H01M 10/0431* (2013.01); *B60R 16/033* (2013.01); *H01M 2/206* (2013.01); *H01M 10/0525* (2013.01); *H01M 2220/20* (2013.01); *Y02T 10/7011* (2013.01)

(58) Field of Classification Search
USPC ......................................................... 307/147
See application file for complete search history.

(56) References Cited

U.S. PATENT DOCUMENTS

2011/0076569 A1  3/2011  Kimura et al.
2011/0195287 A1  8/2011  Kamifuji et al.

FOREIGN PATENT DOCUMENTS

| CN | 102034950 | 4/2011 |
|---|---|---|
| JP | 2011-92995 | 5/2011 |
| JP | 2011-165515 | 8/2011 |

*Primary Examiner* — Robert Deberadinis
(74) *Attorney, Agent, or Firm* — Finnegan, Henderson, Farabow, Garrett & Dunner, LLP

(57) ABSTRACT

A battery includes a roll-up unit provided by winding a sheet unit around an axis, the sheet unit including an electrode sheet having an active material and a separator, the roll-up unit having an exposed portion on which the active material is not placed at an end of the electrode sheet in a direction of the axis; an outer case housing the roll-up unit and having an electrode terminal; an intermediate terminal inside the roll-up unit and having a pair of arm portions resistance-welded to the exposed portion, a first connecting portion connecting the arm portions, and a hole portion formed in the first connecting portion and located between welding points formed in the arm portions; and a collector terminal outside the roll-up unit and resistance-welded to a position opposite to the arm portion in the exposed portion to provide electrical continuity between the roll-up unit and the electrode terminal.

6 Claims, 11 Drawing Sheets

BATTERY

CROSS-REFERENCE TO RELATED APPLICATIONS

This application is a national phase application of International Application No. PCT/JP2012/000191, filed Jan. 13, 2012, the content of which is incorporated herein by reference.

TECHNICAL FIELD

The present invention relates to a battery having a roll-up unit provided by winding, around an axis, a sheet unit including electrode sheets each having an active material placed thereon and a separator.

BACKGROUND ART

A nonaqueous electrolyte secondary battery such as a nickel-hydride secondary battery and a lithium-ion secondary battery includes an outer case and a power-generating element housed in the outer case (see, for example Patent Document 1). A known power-generating element is a roll-up unit provided by winding, around an axis, a sheet unit including a positive electrode sheet and a negative electrode sheet placed one on another with a separator interposed between them. The roll-up unit of this type is housed within the outer case together with an electrolytic solution in such a state that the roll-up unit is pressed in a diameter direction into a flat shape. The roll-up unit has an exposed portion having no active material applied thereto formed at an end in the axis direction. The exposed portion is pressed in the diameter direction of the roll-up unit into a sheet shape, and is welded to a collector terminal in that pressed state.

Improvements in battery output have been required in recent years, and especially, a higher battery output has been needed in a secondary battery which stores an electric power to be supplied to a motor for running of a vehicle. A possible method of increasing the battery output is to increase the number of turns of the roll-up unit. This method, however, involves an increase in thickness of the roll-up unit, so that it is difficult to press the exposed portion into a sheet shape.

Another possible method is to place an intermediate terminal inside the roll-up unit and to place a collector terminal outside the roll-up unit. The intermediate terminal has a pair of arm portions resistant-welded to an inner face of the exposed portion and a connecting portion connecting the arm portions. The collector terminal is resistance-welded to an outer face of the exposed portion opposite to the arm portion. The resistance welding is performed by pressing electrodes against the arm portion and the collector terminal opposite to each other through the exposed portion and passing an electric current through the electrodes.

PRIOR ART DOCUMENT

Patent Document

[Patent Document 1] Japanese Patent Laid-Open No. 2011-92995

DISCLOSURE OF THE INVENTION

Problems to be Solved by the Invention

The method described above, however, suffers a so-called diverting phenomenon in which an electric current intended for the resistance welding of one of the arm portions passes through the other arm portion, so that faulty welding may occur.

To address the problem, it is an object of the present invention to suppress the diverting phenomenon occurring in resistance welding of an intermediate terminal.

Means for Solving the Problems

To solve the abovementioned problem, according to the present invention, (1) a battery includes a roll-up unit provided by winding a sheet unit around an axis, the sheet unit including an electrode sheet having an active material placed thereon and a separator, the roll-up unit having an exposed portion on which the active material is not placed at an end of the electrode sheet in a direction of the axis; an outer case housing the roll-up unit and having an electrode terminal for taking an electric power to the outside; an intermediate terminal placed inside the roll-up unit and having a pair of arm portions resistance-welded to the exposed portion, a first connecting portion connecting the pair of arm portions, and a first hole portion formed in the first connecting portion and located between welding points each formed in each of the pair of arm portions; and a collector terminal placed outside the roll-up unit and resistance-welded to a position opposite to the arm portion in the exposed portion to provide electrical continuity between the roll-up unit and the electrode terminal.

(2) In the configuration of (1) described above, the first connecting portion may have a protruding shape which protrudes toward the center in the axis direction of the roll-up unit. According to the configuration of (2), the intermediate terminal can be inserted easily.

(3) In the configuration of (2) described above, the first connecting portion is connected to the arm portion through a bend portion, and the first connecting portion has a tapered face between the first hole portion and the bend portion. According to the configuration of (3), the exposed portion is prevented from being caught on an edge of the first hole portion in inserting the intermediate terminal. This reduces a load applied to the exposed portion.

(4) In the configuration of (1) to (3) described above, the intermediate terminal includes two intermediate terminals formed to be placed side by side in a first direction orthogonal to the axis direction, the first direction being orthogonal to a second direction in which the pair of arm portion are opposite to each other, and one of the intermediate terminals and the other of the intermediate terminals placed side by side in the first direction are electrically connected to each other by a second connecting portion formed in a portion of a region across which the intermediate terminals are opposite to each other. According to the configuration of (4), since the second connecting portion formed in the portion of a region across which the intermediate terminals are opposite to each other narrows an electric current path, the diverting phenomenon between welding points placed side by side in the first direction can be suppressed.

(5) In the configuration of (4) described above, the second connecting portion can be formed at a position avoiding a line connecting a welding point in the one of the intermediate terminals and a welding point in the other of the intermediate terminals. According to the configuration of (5), the effect described in (4) can be enhanced.

According to the present invention, the diverting phenomenon occurring in resistance welding of the intermediate terminal can be suppressed.

BEST MODE FOR CARRYING OUT THE INVENTION

Embodiment 1

Figure 1:
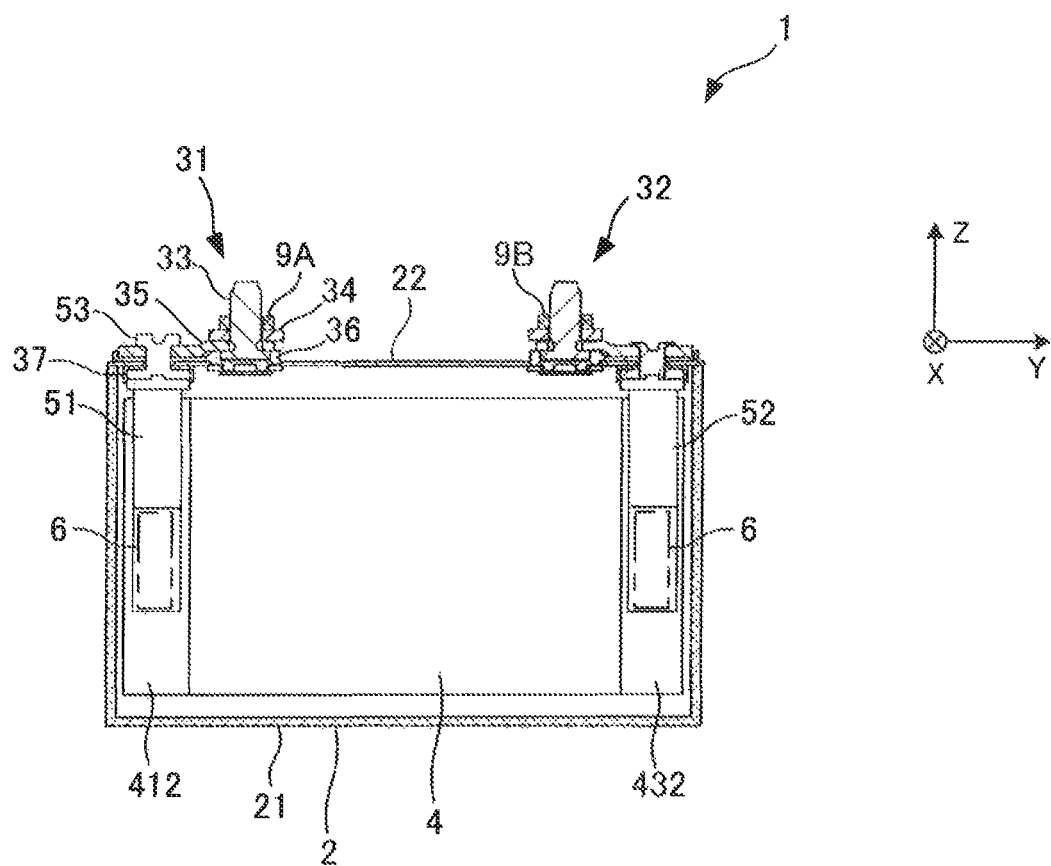
FIG. 1 is a section view of a battery.

An embodiment according to the present invention will hereinafter be described with reference to the drawings. FIG. 1 is a section view of a battery cut along a Y-Z plane. An X axis, a Y axis, and a Z axis are three axes orthogonal to each other. A battery 1 may be a nonaqueous electrolyte secondary battery such as a nickel-hydride secondary battery or a lithium-ion secondary battery. The battery 1 may be a battery which stores an electric power to be supplied to a motor for running of a vehicle. The motor for running of a vehicle can be mounted on an electric car, a hybrid car and the like. In this case, an assembled battery including a plurality of batteries 1 connected to each other can be mounted on the vehicle.

The battery 1 includes an outer case 2, a roll-up unit 4, an intermediate terminal 6, a positive electrode terminal 31, a negative electrode terminal 32, a positive electrode collector terminal 51, and a negative electrode collector terminal 52. The outer case 2 includes a case body 21 and a lid 22. The case body 21 is formed in a bottomed box shape having a pair of side faces opposite to each other in the X axis direction, a pair of side faces opposite to each other in the Y axis direction, and a bottom face. The lid 22 is placed at a position to close an opening portion of the case body 21 and is welded to an inner face of the case body 21. The outer case 2 may be made of aluminum or resin.

Figure 2:
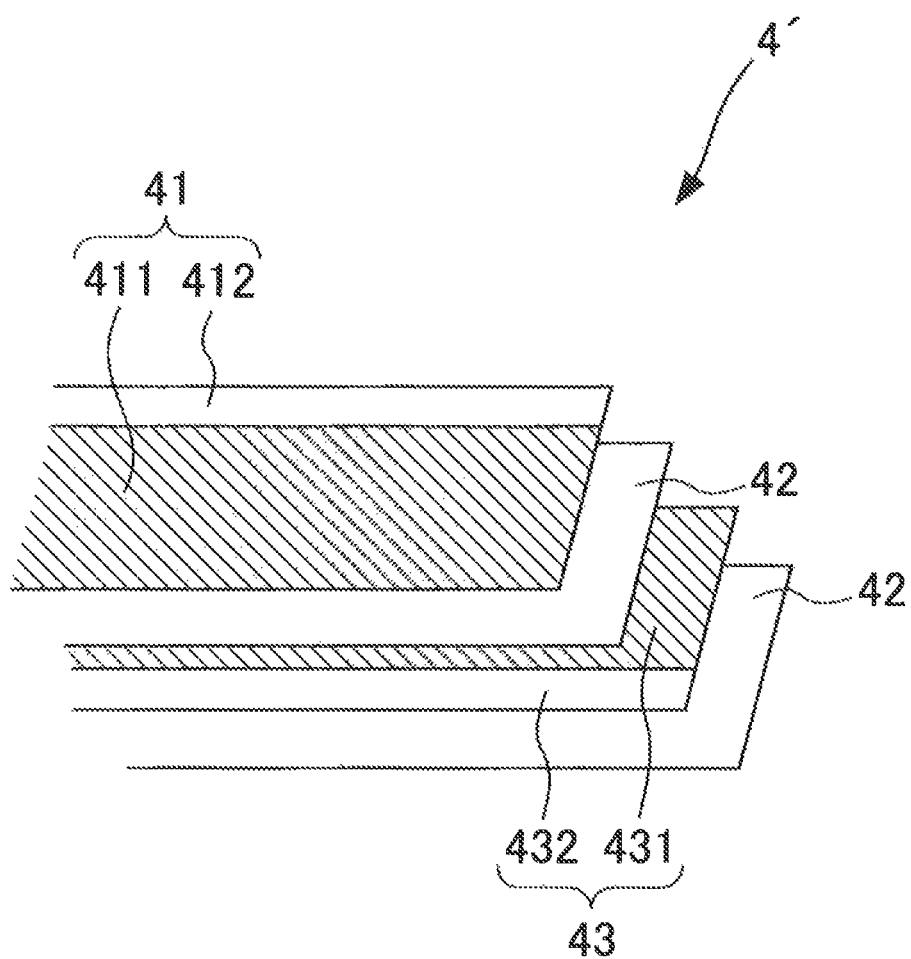
FIG. 2 is a perspective view of part of a sheet unit which is a developed roll-up unit.

The roll-up unit 4 is housed in the outer case 2 together with an electrolytic solution. The roll-up unit 4 is formed by winding a sheet unit serving as a power-generating element around an axis. The axis of the roll-up unit 4 extends in the Y axis direction. The axis refers to a virtual axis and should not be interpreted as a shaft member. FIG. 2 is a perspective view of part of a sheet unit 4' which is the developed roll-up unit 4. The sheet unit 4' includes a positive electrode sheet 41 (electrode sheet), a negative electrode sheet 43 (electrode sheet), and a separator 42 interposed between the positive electrode sheet 41 and the negative electrode sheet 43. The electrolytic solution may be impregnated into the separator 42.

The positive electrode sheet 41 includes a power-generating region 411 in which a positive electrode active material is applied to metal foil, and a positive electrode side exposed portion 412 made of metal foil to which the positive electrode active material is not applied. The metal foil may be aluminum. The positive electrode active material may be a composite oxide of lithium and a transition metal. The positive electrode active material may contain a conductive agent. The conductive agent may be acetylene black, carbon black, graphite, carbon fiber, and carbon nanotube.

The negative electrode sheet 43 includes a power-generating region 431 in which a negative electrode active material is applied to metal foil, and a negative electrode side exposed portion 432 made of metal foil to which the negative electrode active material is not applied. The metal foil may be copper. The negative electrode active material may be carbon. The negative electrode active material may contain a conductive agent. The conductive agent may be acetylene black, carbon black, graphite, carbon fiber, and carbon nanotube.

Referring again to FIG. 1, the positive electrode side exposed portion 412 is formed at one end of the roll-up unit 4 in the axis direction, and the negative electrode side exposed portion 432 is formed at the other end of the roll-up unit 4 in the axis direction. The intermediate terminal 6 placed inside the roll-up unit 4 is resistance-welded to each of the positive electrode side exposed portion 412 and the negative electrode side exposed portion 432. The positive electrode collector terminal 51 placed outside the roll-up unit 4 is resistance-welded to the positive electrode side exposed portion 412. The negative electrode collector terminal 52 placed outside the roll-up unit 4 is resistance-welded to the negative electrode side exposed portion 432. The resistance welding is described later in detail.

The positive electrode terminal 31 includes a terminal bolt 33, a nut 9A, a connecting terminal 35, a support member 36, a gasket 37, and a rivet portion 53. The rivet portion 53 passes through the connecting terminal 35, the support member 36, and the gasket 37 to extend in the Z axis direction and is riveted to an upper face of the connecting terminal 35.

The terminal bolt 33 is inserted in the connecting terminal 35. The terminal bolt 33 is formed in a protruding shape and has a screw thread formed in an outer peripheral face. The terminal bolt 33 is placed on the support member 36. The terminal bolt 33 is inserted in a bus bar 34 from above the connecting terminal 35, and the nut 9A is tightened to the terminal bolt 33 from above the bus bar 34 to fix the connecting terminal 35 and the bus bar 34. The support member 36 may be made of resin. Since the negative electrode terminal 32 has the same structure as that of the positive electrode terminal 31, description thereof is omitted.

Figure 3:
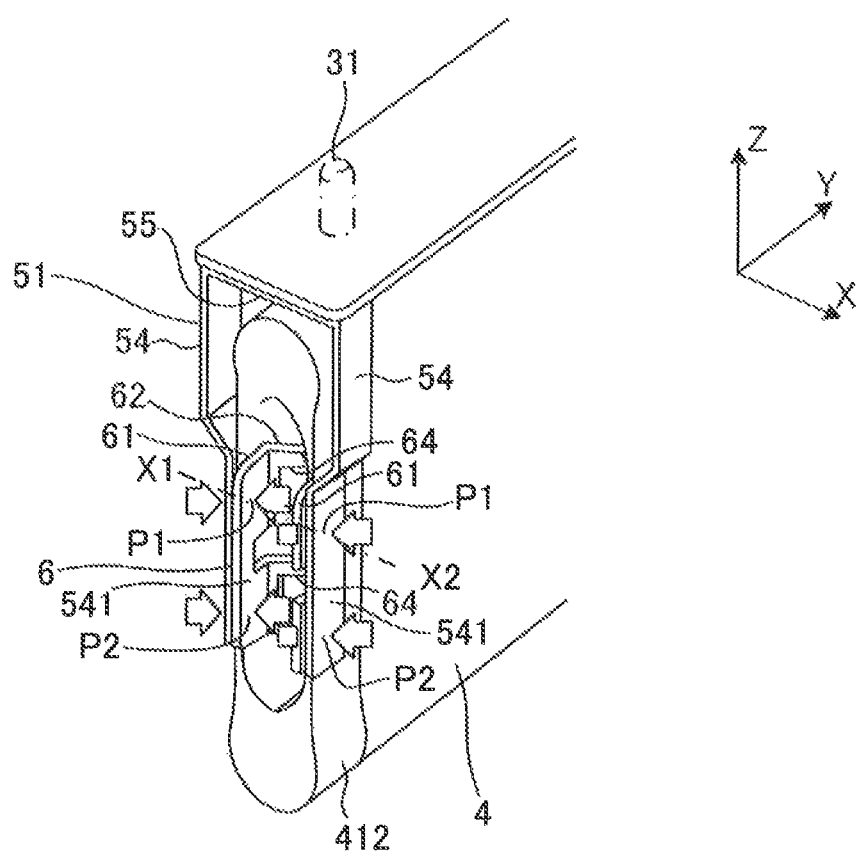
FIG. 3 is a perspective view showing the battery before incorporation into a case body.

Next, detailed description is made of a structure for connecting the positive electrode collector terminal 51, the intermediate terminal 6, and the roll-up unit 4. FIG. 3 is a perspective view showing the battery before incorporation into the case body. The positive electrode collector terminal 51 includes a pair of collector terminal portions 54 and a top face portion 55. The pair of collector terminal portions 54 are opposite to each other in the X axis direction. The top face portion 55 connects the ends of the pair of collector terminal portions 54 in the Z axis direction and is connected electrically and mechanically to the rivet portion 53.

Each of the pair of collector terminal portions 54 has a roll-up unit contact portion 541. The roll-up unit contact portion 541 is formed by bending a lower end portion of the collector terminal portion 54 toward the inside of the roll-up unit 4 in the diameter direction. The roll-up unit contact portion 541 is resistance-welded to the positive electrode side exposed portion 412 of the roll-up unit 4 pressed toward the axis. This causes electrical continuity between the collector terminal portion 54 and the roll-up unit 4. Since a structure for connecting the negative electrode collector terminal 52, the intermediate terminal 6, and the roll-up unit 4 is similar to the structure on the positive electrode side described above, description thereof is omitted. The positive electrode collector terminal 51 can be made of the same material as that of the positive electrode sheet 41. The negative electrode collector terminal 52 can be made of the same material as that of the negative electrode sheet 43.

Figure 4:
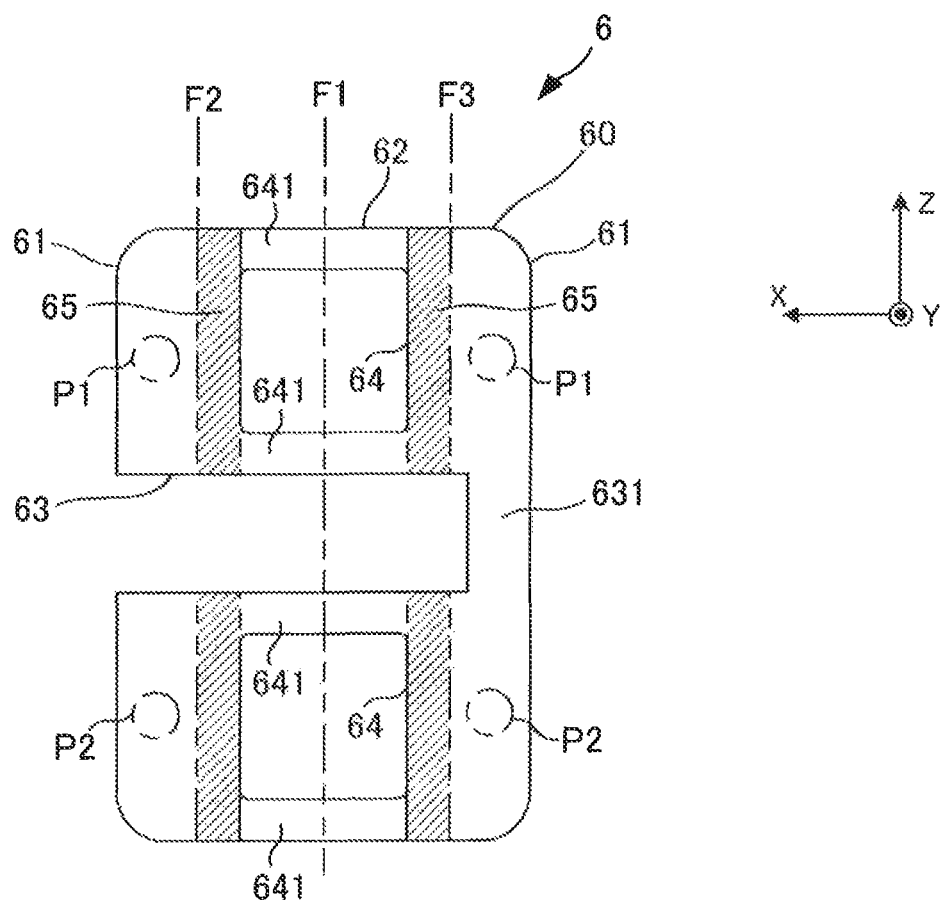
FIG. 4 is a developed view of an intermediate terminal.
Figure 5:
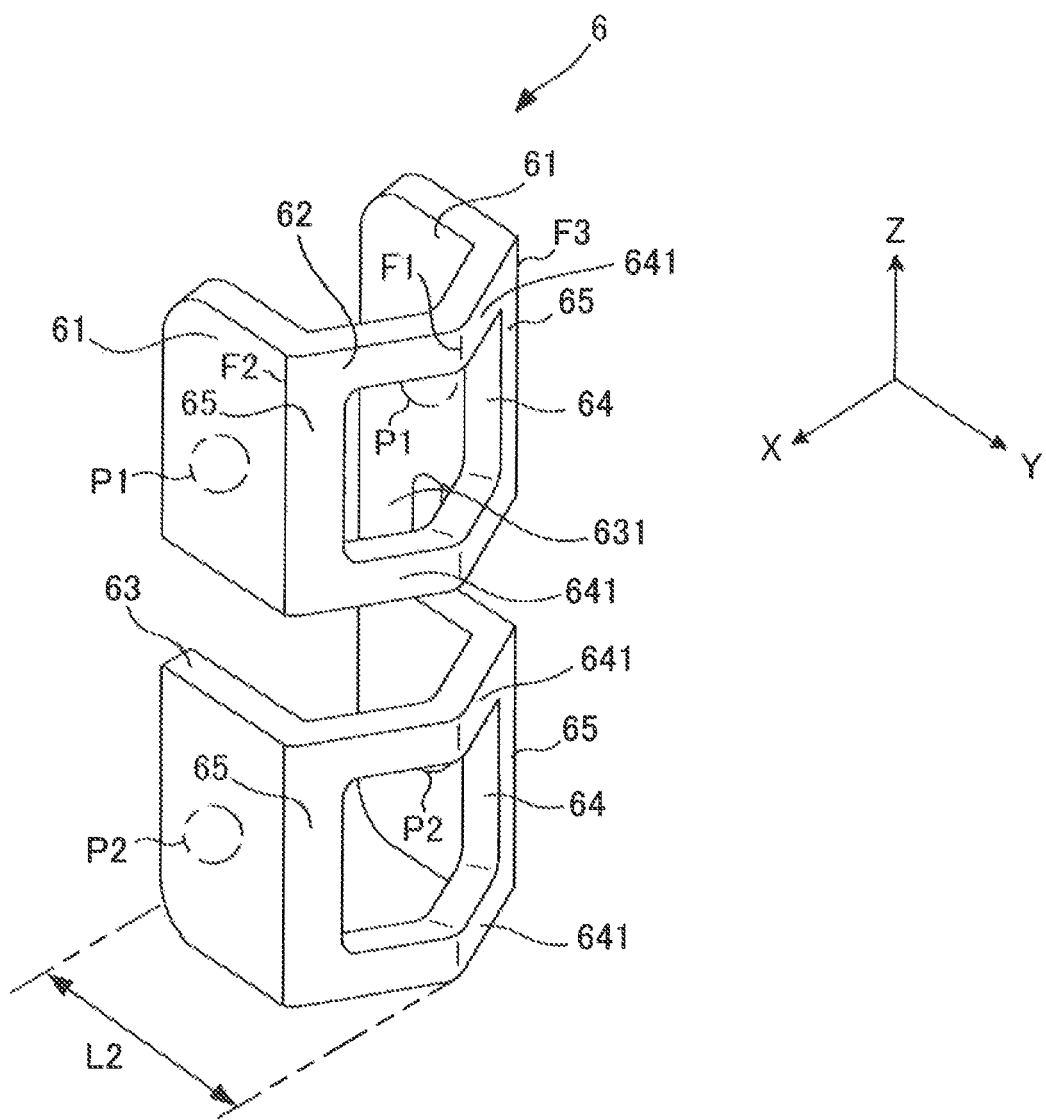
FIG. 5 is a perspective view of the intermediate terminal.

Referring to FIG. 4 and FIG. 5, the intermediate terminal 6 is described in detail. FIG. 4 is a developed view of the intermediate terminal, and FIG. 5 is a perspective view of the intermediate terminal. Referring to FIG. 4, a metal plate 60 has a second hole portion 63 and a pair of first hole portion 64. The second hole portion 63 is formed at the center of the metal plate 60 in the longitudinal direction (Z axis direction). The second hole portion 63 extends in the X axis direction and has one end opened and the other end closed by a second bridge (corresponding to a second connecting portion) 631. In other words, the second hole portion 63 is formed in a generally rectangular shape when viewed from the Y axis direction.

The pair of first hole portions 64 are formed at positions between which the second hole portion 63 is sandwiched. The first hole portion 64 is formed in a generally square shape when viewed from the Y axis direction. The first hole portion 64 is closed by a first bridge 641 at each end in the Z axis direction. F1, F2, and F3 show bend portions. The metal plate 60 is bent along the bend portions F1, F2, and F3 to form the intermediate terminal 6. A region of the metal plate 60 sandwiched between the bend portions F2 and F3 provides a connecting portion (corresponding to a first connecting portion) 62 shown in FIG. 3 and FIG. 5. A region of the connecting portion 62 shown by hatching in FIG. 4 provides a guide portion 65 shown in FIG. 5. In addition, a region of the metal plate 60 except the connecting portion 62 provides an arm portion 61 shown in FIG. 3 and FIG. 5. In FIG. 5, a direction in which welding portions P1 and P2 are placed side by side (that is, the Z axis direction) corresponds to a first direction, and a direction in which the pair of arm portions 61 are opposite to each other (that is, the X axis direction) corresponds to a second direction.

In FIG. 4, the pair of welding points P1 are set at positions between which the first hole portion 64 is sandwiched, and the pair of welding points P2 are set at positions between which the first hole portion 64 is sandwiched. The welding points P1 and P2 are set at positions between which the second hole portion 63 is sandwiched.

The metal plate 60 is sequentially provided by performing press-forming of a sheet of plate material serving as a base material. In this case, the press-forming is performed such that a connecting portion which couples adjacent metal plates 60 is left, so that a single sheet of plate material having a plurality of metal plates 60 can be obtained. This allows the plurality of metal plates 60 can be easily transferred as the single sheet of plate material to the next step (bending step). After the transfer, the connecting portions in the plate material can be cut and removed to provide the individual metal plates 60.

Referring again to FIG. 3, the pair of arm portions 61 are resistance-welded to the inner face of the positive electrode side exposed portion 412. The inner face of the positive electrode side exposed portion 412 refers to an inside face of the roll-up unit 4 in the diameter direction. The pair of arm portions 61 are opposite to each other in the X axis direction and extend along the Y axis direction, that is, in the axis direction of the roll-up unit 4. Each of the arm portions 61 is resistance-welded at the welding points P1 and P2.

Figure 6:
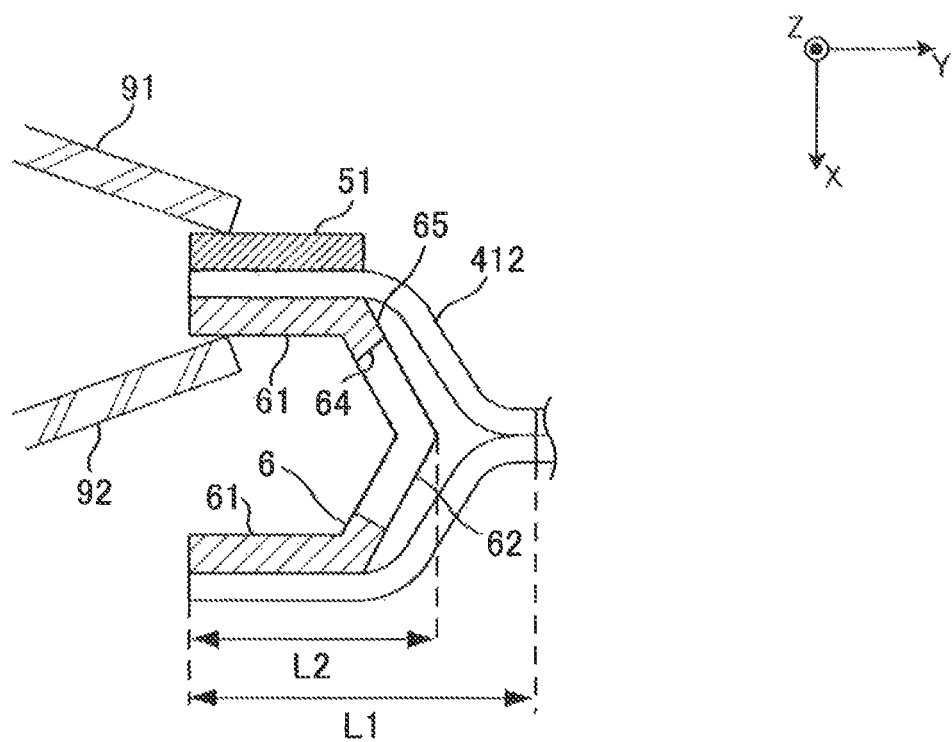
FIG. 6 is a section view of the battery shown in FIG. 3 cut along X1-X2 in the Y axis direction.

Referring to FIG. 6, description is made of how to perform the resistance welding. FIG. 6 is a section view of the battery shown in FIG. 3 cut along X1-X2 in the Y axis direction. Components other than those necessary for the description are omitted. Referring to FIG. 6, the intermediate terminal 6 is first pushed into the roll-up unit 4. The positive electrode side exposed portion 412 protruding from the end of the roll-up unit 4 in the axis direction is previously pulled toward the inside of the roll-up unit 4 in the diameter direction.

The connecting portion 62 is formed at an end of the intermediate terminal 6 in the pushing direction and is formed sharply in a tapered shape which is pointed toward the end in the pushing direction. When the intermediate terminal 6 is pushed into the roll-up unit 4, the positive electrode side exposed portion 412 abuts on the tapered face of the connecting portion 62 and is thus enlarged. This facilitates the insertion of the intermediate terminal 6 and reduces a load on the positive electrode side exposed portion 412 during the pushing. When the intermediate terminal 6 is further pushed in, the positive electrode side exposed portion 412 is further enlarged while it is guided by the guide portion 65 of the connecting portion 62. This can enhance the abovementioned effects. The provision of the guide portion 65 can prevent the positive electrode side exposed portion 412 from being caught on the edge of the first hole 64. This reduces the load on the positive electrode side exposed portion 412.

The intermediate terminal 6 is pushed to a fixing position shown in FIG. 6. It is preferable that the condition of L1>L2 is satisfied where L1 represents the size of the positive electrode side exposed portion 412 in the axis direction and L2 represents the size of the intermediate terminal 6 in the axis direction. This can prevent the intermediate terminal 6 from coming into contact with the active material.

Next, an electrode 91 is pressed against a welding point in the roll-up unit contact portion 541 of the collector terminal portion 54 (that is, a position corresponding to the welding point P1) from the outside of the roll-up unit 4 in the diameter direction. In addition, an electrode 92 is pressed against a welding point of the arm portion 61 (that is, a position corresponding to the welding point P1) from the inside of the roll-up unit 4 in the diameter direction. An electric current is passed with the electrodes 91 and 92 pressed against the welding points. This melts portions of the roll-up unit contact portion 541, the positive electrode side exposed portion 412, and the arm portion 61 with Joule heat to connect the intermediate terminal 6 electrically and mechanically to the roll-up unit 4.

Since the first hole portion 64 is formed between the pair of welding points P1 as shown in FIG. 5, the current path can be narrowed. This can prevent the diverting phenomenon in which the electric current passed to one of the welding points P1 is diverted toward the other welding point P1. As a result, faulty welding can be suppressed. Since the second hole portion 63 is formed between the welding point P1 and P2 placed side by side in the Z direction, the current path can be narrowed similarly. This can prevent the diverting phenomenon in which the electric current passed to the welding point P1 is diverted toward the welding point P2. As a result, faulty welding can also be suppressed. The resistance welding is performed sequentially in the same manner on the other welding points.

Embodiment 2

Figure 7:
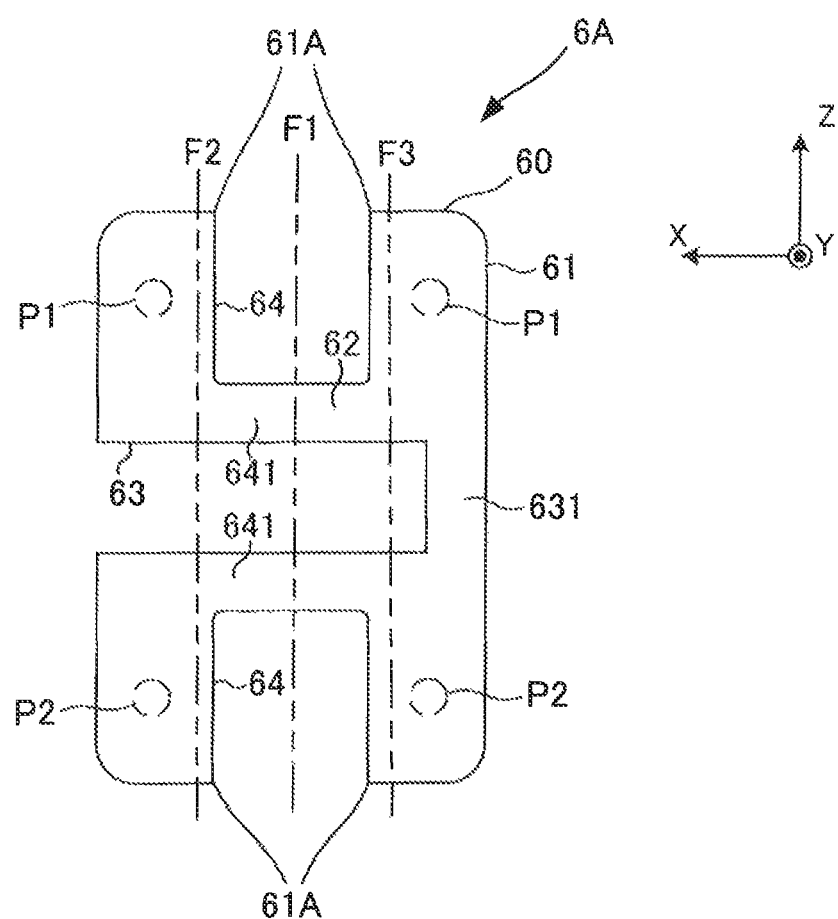
FIG. 7 is a developed view of an intermediate terminal of Embodiment 2.

An intermediate terminal of the present embodiment is described with reference to FIG. 7. FIG. 7 is a developed view of the intermediate terminal of the present embodiment.

Components having the same functions as those in Embodiment 1 are designated with the same reference numerals. An intermediate terminal 6A differs from the intermediate terminal 6 of Embodiment 1 in that the first bridge 641 formed at each end in the Z axis direction is omitted. According to the present embodiment, a current path between welding points P1 is further narrowed, so that the diverting phenomenon can be suppressed more effectively. However, in inserting the intermediate terminal 6A into a roll-up unit 4, an edge portion 61A formed at each end of a first hole portion 64 in the Z axis direction may catch a positive electrode side exposed portion 412 to apply a load thereto. In this respect, the structure is less advantageous than that of Embodiment 1.

Embodiment 3

Figure 8:
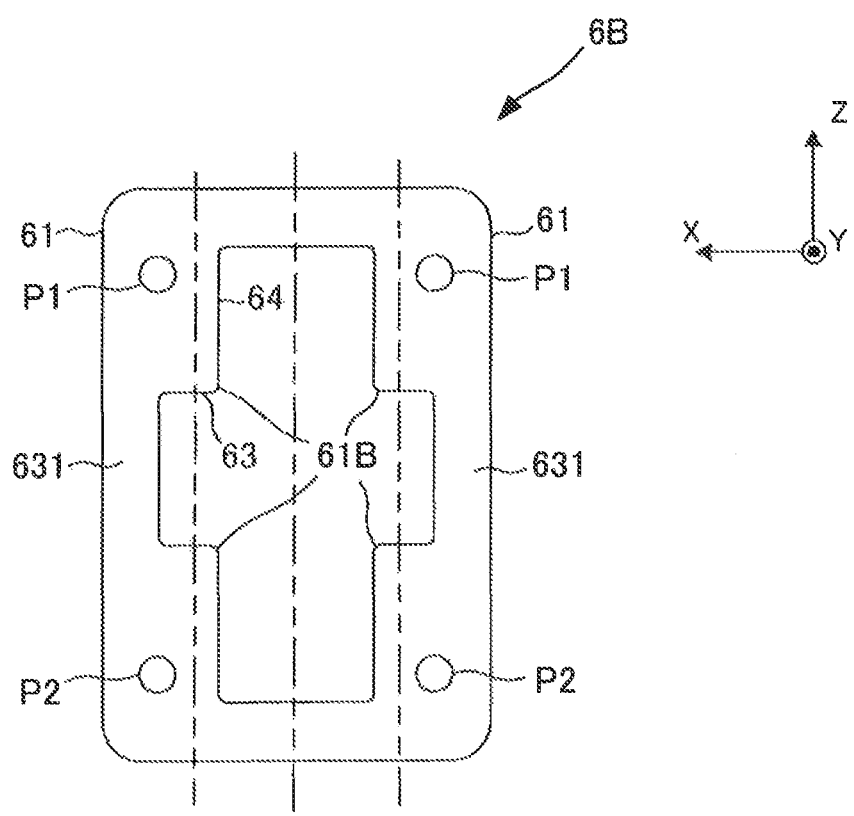
FIG. 8 is a developed view of an intermediate terminal of Embodiment 3.

Referring to FIG. 8, an intermediate terminal of the present embodiment is described. FIG. 8 is a developed view of the intermediate terminal of the present embodiment. Components having the same functions as those in Embodiment 1 are designated with the same reference numerals. Since a first hole portion 64 is formed between a pair of welding points P1, the diverting phenomenon can be suppressed in which an electric current flows from one of the welding points P1 to the other welding point P1 in resistance welding. Since a current path formed between the welding points P1 and P2 placed side by side in the Z axis direction is narrowed by a second bridge 631, a diversion of an electric current flowing from one welding point P1 (P2) to the other welding point P2 (P1) can be suppressed in resistance welding. However, in inserting an intermediate terminal 6B into a roll-up unit 4, an edge portion 61B at each boundary between the first hole portion 64 and a second hole portion 63 may catch a positive electrode side exposed portion 412 to apply a load thereto. In this respect, the structure is less advantageous than that of Embodiment 1.

Embodiment 4

Figure 9:
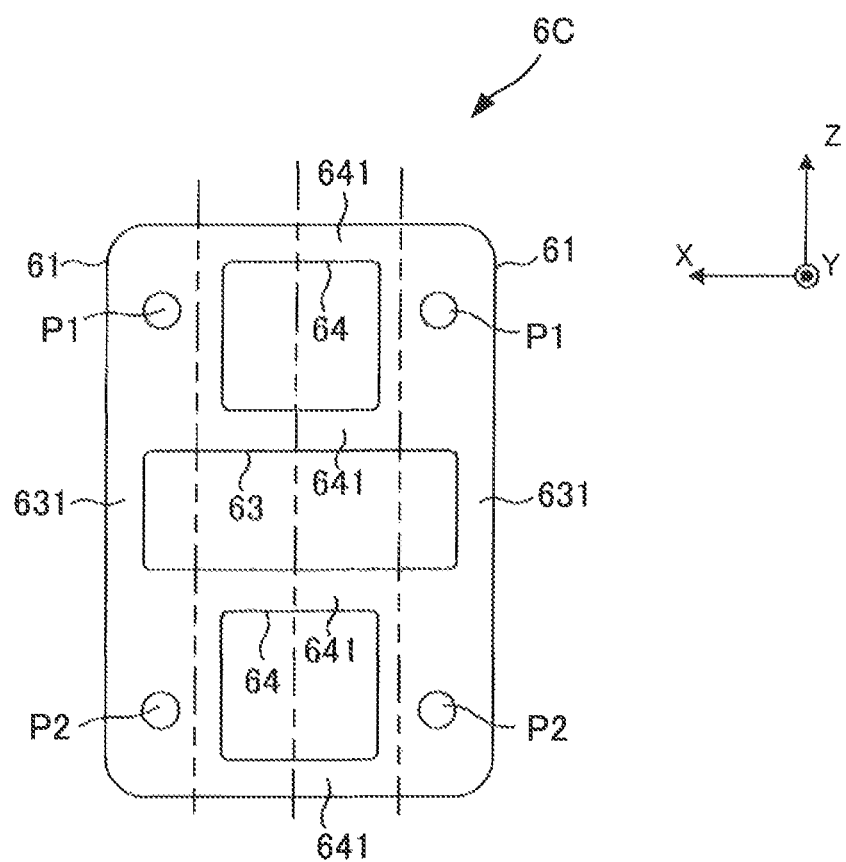
FIG. 9 is a developed view of an intermediate terminal of Embodiment 4.

Referring to FIG. 9, an intermediate terminal of the present embodiment is described. FIG. 9 is a developed view of the intermediate terminal of the present embodiment. Components having the same functions as those in Embodiment 1 are designated with the same reference numerals. An intermediate terminal 6C differs from the intermediate terminal 6 of Embodiment 1 in that a second bridge 631 is provided on each side in the X axis direction. Since the intermediate terminal 6C does not have the edge portion 61A formed in the intermediate terminal 6A or the edge portion 61B formed in the intermediate terminal 6B, the insertion is further facilitated in inserting the intermediate terminal 6C into a roll-up unit 4. However, since the number of the second bridges 631 is increased in the present embodiment, the effect of suppressing the diversion reduces comparing with the intermediate terminal 6 of Embodiment 1.

Embodiment 5

Figure 10:
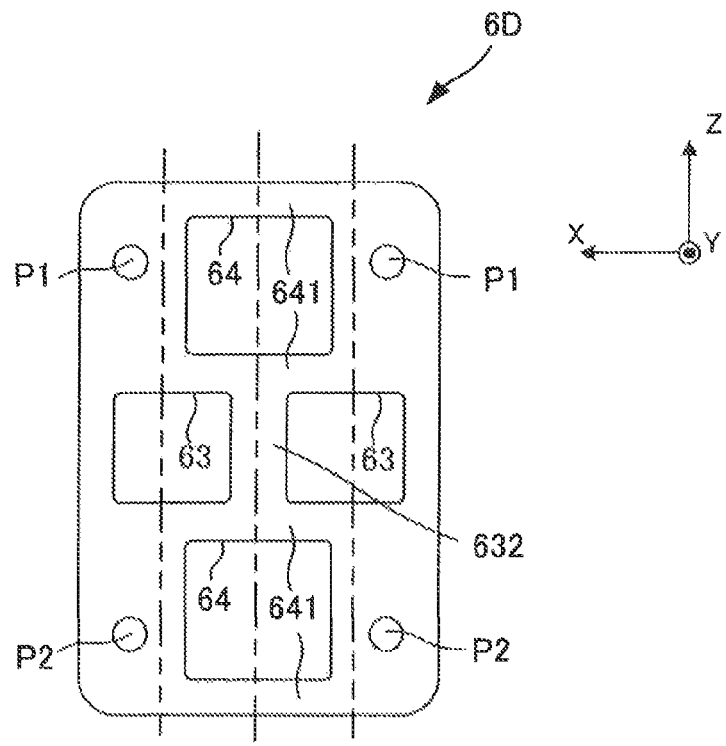
FIG. 10 is a developed view of an intermediate terminal of Embodiment 5.

Referring to FIG. 10, an intermediate terminal of the present embodiment is described. FIG. 10 is a developed view of the intermediate terminal of the present embodiment. Components having the same functions as those in Embodiment 1 are designated with the same reference numerals. An intermediate terminal 6D has second hole portions 63 separated in the X axis direction and a third bridge 632 formed between the second hole portions 63. Since the formation of the third bridge 632 increases the rigidity of a bend portion F1 as compared with the structure of Embodiment 1, it is relatively difficult to bend the metal plate along the bend portion F1.

Embodiment 6

Figure 11:
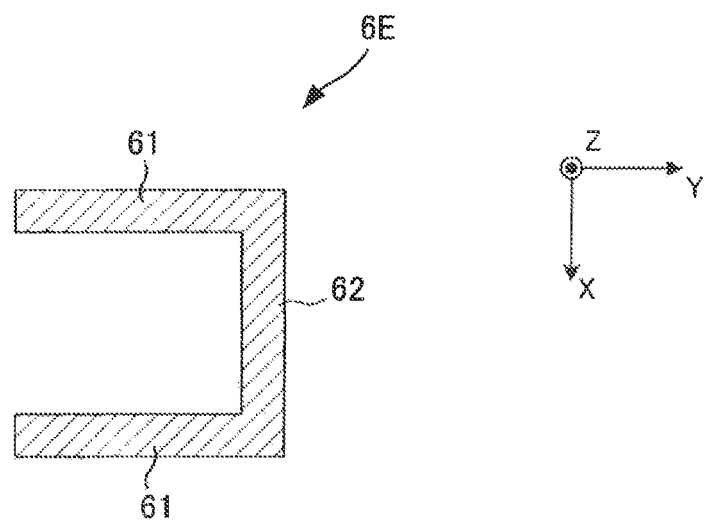
FIG. 11 is a plan view of an intermediate terminal of Embodiment 6.

Referring to FIG. 11, an intermediate terminal of the present embodiment is described. FIG. 11 is a plan view of the intermediate terminal of the present embodiment. Components having the same functions as those in Embodiment 1 are designated with the same reference numerals. An intermediate terminal 6E differs from the intermediate terminal 6 of Embodiment 1 in that a connecting portion 62 does not have a protruding shape but extends in a direction orthogonal to the axis direction of a roll-up unit 4. In the structure of the present embodiment, a first hole portion can also be formed in the connecting portion 62 to suppress the diverting phenomenon in which an electric current is diverted from one welding point P1 to the other welding point P1.

Embodiment 7

Figure 12:
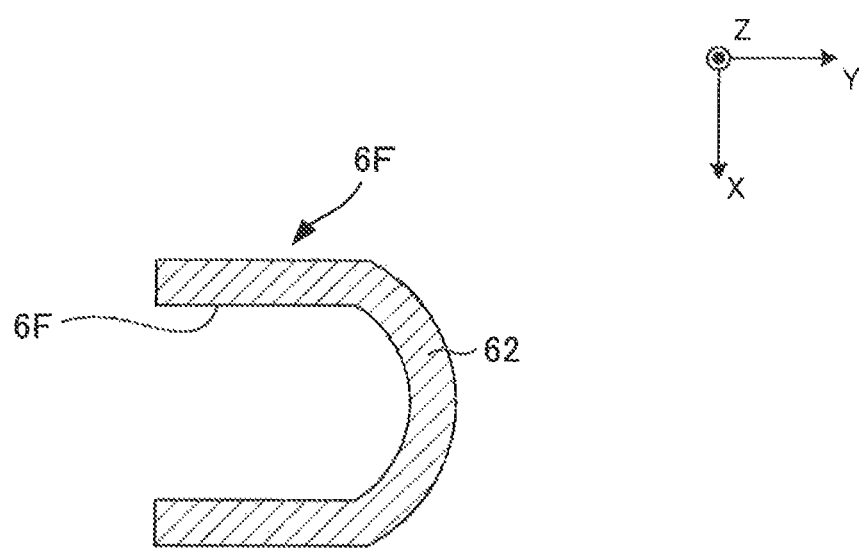
FIG. 12 is a plan view of an intermediate terminal of Embodiment 7.

Referring to FIG. 12, an intermediate terminal of the present embodiment is described. FIG. 12 is a plan view of the intermediate terminal of the present embodiment. Components having the same functions as those in Embodiment 1 are designated with the same reference numerals. An intermediate terminal 6F has a connecting portion 62 protruding toward the center in the axis direction of a roll-up unit 4 and warped in an arc shape. In the structure of the present embodiment, a first hole portion can also be formed in the connecting portion 62 to suppress the diverting phenomenon in which an electric current is diverted from one welding point P1 to the other welding point P1.

Modification

While the four welding points are provided in the embodiments described above, two, or six or more welding points may be provided. When two welding points are provided, the second hole portion 63 can be omitted.

The invention claimed is:
1. A battery comprising:
  a roll-up unit provided by winding a sheet unit around an axis, the sheet unit including an electrode sheet having an active material placed thereon and a separator, the roll-up unit having an exposed portion on which the active material is not placed at an end of the electrode sheet in a direction of the axis;
  an outer case housing the roll-up unit and having an electrode terminal for taking an electric power to the outside;
  an intermediate terminal placed inside the roll-up unit and having a pair of arm portions resistance-welded to the exposed portion, a first connecting portion connecting the pair of arm portions, and a first hole portion formed in the first connecting portion and located between welding points each formed in each of the pair of arm portions; and
  a collector terminal placed outside the roll-up unit and resistance-welded to a position opposite to the arm portion in the exposed portion to provide electrical continuity between the roll-up unit and the electrode terminal.
2. The battery according to claim 1, wherein the first connecting portion has a protruding shape which protrudes toward the center in the axis direction of the roll-up unit.

3. The battery according to claim 2, wherein the first connecting portion is connected to the arm portion through a bend portion, and the first connecting portion has a tapered face between the first hole portion and the bend portion.

4. The battery according to claim 1, wherein the intermediate terminal comprises two intermediate terminals formed to be placed side by side in a first direction orthogonal to the axis direction, the first direction being orthogonal to a second direction in which the pair of arm portion are opposite to each other, and one of the intermediate terminals and the other of the intermediate terminals placed side by side in the first direction are electrically connected to each other by a second connecting portion formed in a portion of a region across which the intermediate terminals are opposite to each other.

5. The battery according to claim 4, wherein the second connecting portion is formed at a position avoiding a line connecting a welding point in the one of the intermediate terminals and a welding point in the other of the intermediate terminals.

6. A vehicle comprising:

a vehicle battery including a plurality of the batteries according to claim 1; and a motor generating an energy for running of a vehicle from an electric power output from the vehicle battery.

\* \* \* \* \*